A. BABENDREER.
PROCESS OF TREATING FOOD.
APPLICATION FILED SEPT. 17, 1917.
1,327,220.
Patented Jan. 6, 1920.
2 SHEETS—SHEET 1.
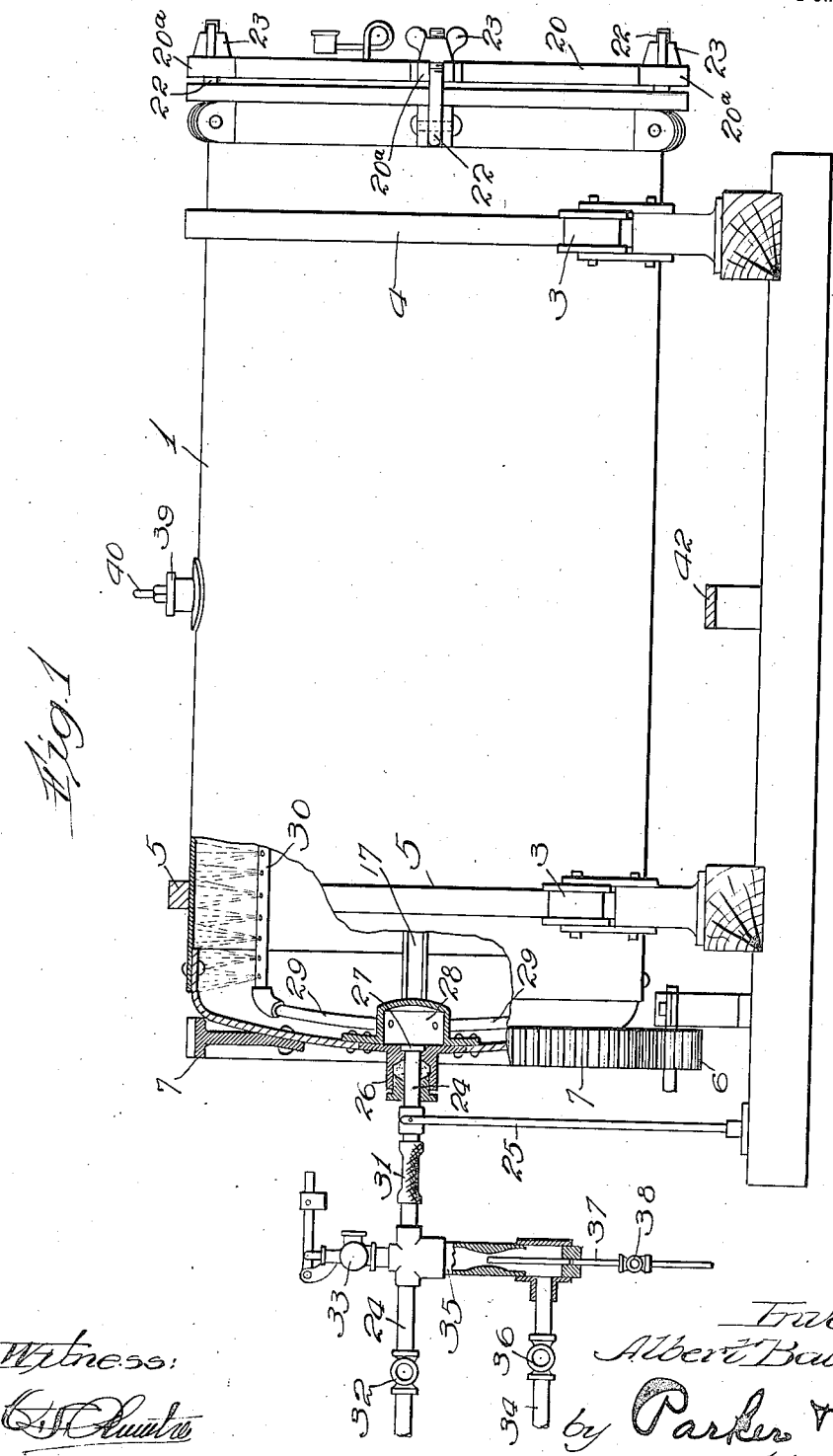

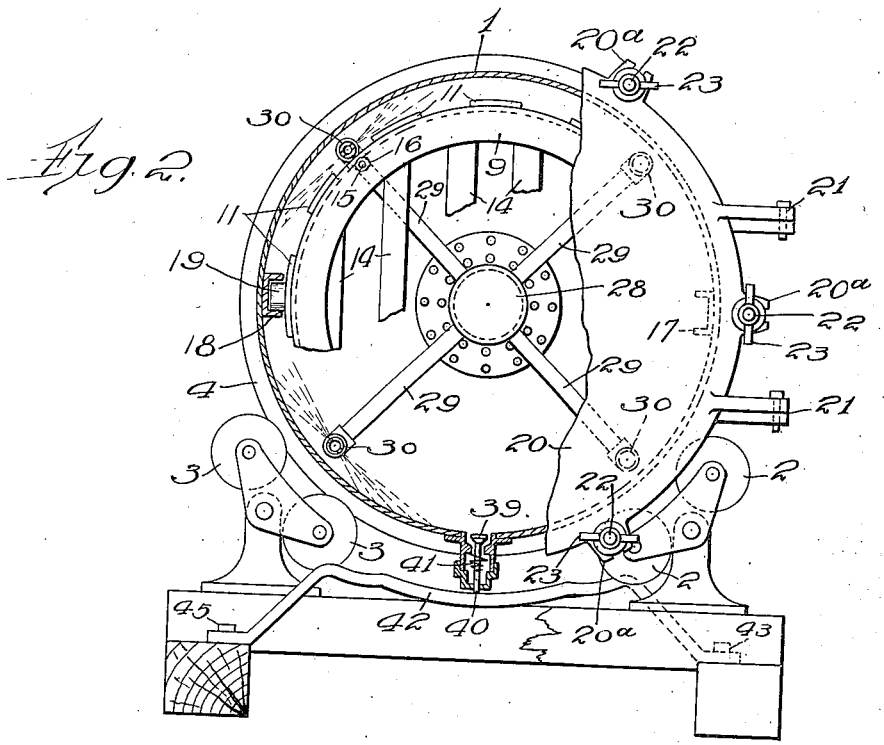
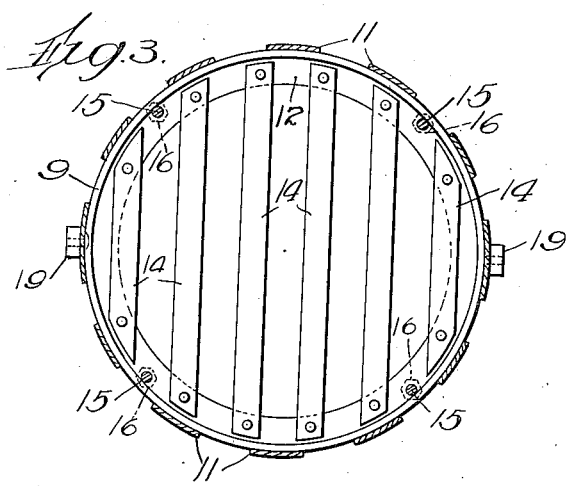
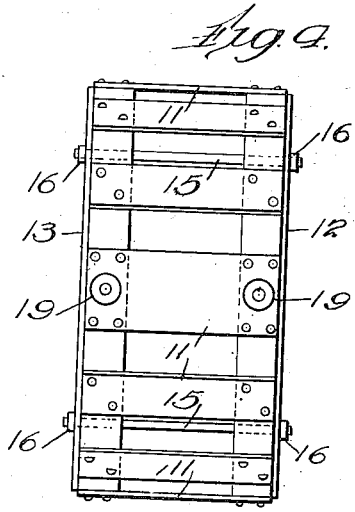
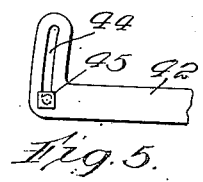

UNITED STATES PATENT OFFICE.

ALBERT BABENDREER, OF OCEAN SPRINGS, MISSISSIPPI, ASSIGNOR TO WHOLE GRAIN WHEAT COMPANY, OF PHOENIX, ARIZONA, A CORPORATION OF ARIZONA.

PROCESS OF TREATING FOOD.

1,327,220.  Specification of Letters Patent.  Patented Jan. 6, 1920.

Application filed September 17, 1917. Serial No. 191,792.

*To all whom it may concern:*

Be it known that I, ALBERT BABENDREER, a citizen of the United States, residing at Ocean Springs, in the county of Jackson and State of Mississippi, have invented a certain new and useful Improvement in Processes of Treating Foods, of which the following is a specification.

This invention relates to a new and improved process of treating foods such as wheat, oats, rice, corn or other grain, legumes or the like, and has for its object to provide a new and improved process of this description. The invention has among other objects to provide a process of treating foods that require cooking so that such foods will retain substantially all of the elements of which they are composed in their natural form without loss thereof through evaporation or other means and also preserve, if desired, the foods in their whole or whole grain form when prepared, and to further preserve them after preparation, through long periods of time, and to make them tasty, cheap and healthful and when a grain like wheat is used, to provide a complete balanced food having all of the elements necessary for the growth of the body and the preservation thereof in a healthful condition.

The invention is illustrated in the accompanying drawings, wherein—

Figure 1 is a side elevation in part section showing one form of apparatus for carrying out the process.

Fig. 2 is an end elevation of the apparatus shown in Fig. 1 with parts broken away.

Fig. 3 is an end view of the device for holding the receptacles in which the food is contained.

Fig. 4 is a side elevation of the device illustrated in Fig. 3.

Fig. 5 is a plan view of the adjustable end of the valve part which actuates the tank valve.

Like numerals refer to like parts throughout the several figures.

In carrying out the process I place the grain, legume or other material with sufficient moisture in a receptacle, preferably the receptacle in which it is sold to the consumer, the receptacle being only partially filled and hermetically sealed and this receptacle and the material is then heated and while being heated is moved so as to move the material from one portion thereof to another in order to secure proper and uniform treatment of the different portions of the material and the proper absorption of moisture by all of the different portions thereof. The receptacle and material therein are then cooled and are ready for distribution. The process may be carried out wholly by hand manipulation, but I prefer to provide a suitable mechanism of any desired form by means of which a number of receptacles or cans may be simultaneously carried through the process in order to reduce the cost of preparing the food. In the accompanying drawings I have shown one form of apparatus for this purpose.

As illustrated in such drawings I provide a tank 1 into which the receptacles containing the food to be treated are placed. This tank is preferably arranged so that it may be rotated, and as illustrated in the drawing, is mounted upon the rollers 2 and 3. I have shown rollers at each end. The rollers are preferably grooved, as illustrated, and the revolving tank is provided with the tracks 4 and 5, one at each end, which preferably fit into the grooves of the rollers. The tank is rotated in any desired manner, as by means of the gear 6 which engages a circular rack 7 connected with the tank.

The receptacles containing the food to be treated are then placed in the tank 1 and the tank is properly heated and is then moved, so as to move the receptacles containing the food in order to move the food therein to different portions of said receptacle. These receptacles may be of any desired form, size, shape or arrangement. In order to show a specific construction, the food may be placed in any desired receptacles such, for example, as cans. A suitable amount of the food such as the grain or legume to be treated is placed in each can or receptacle with a sufficient amount of moisture. The moisture may be applied in any desired manner, either before the food is placed in the can or after it is placed in the can. I prefer to take the grain in a raw condition and place a portion thereof in each receptacle and also place in such receptacle the desired amount of liquid and then seal the receptacle. Since the grain and legumes are ripe or matured, they are in a comparatively dry state, containing only the moisture which matured grain or legumes ordinarily have. The added moisture during the cooking process is absorbed by the grain and legumes, and they expand or swell as a result; and hence at the beginning of the process, the receptacles are only partially filled. I prefer to place in the receptacles such an amount of the grain or legumes that when the cooking is completed, the receptacle will be substantially filled; and I prefer to add such an amount of moisture that it will be substantially all absorbed by the grain or legumes when the cooking has been completed. The liquid may be water or any other liquid with which it is desired to treat the food. I prefer to use water and salt and sugar in sufficient quantities to secure the desired palatability. The liquid may be therefore a solution of the salt and sugar in water or any other treating solution. It is of course evident that the amount of moisture used will depend upon the results desired and will be regulated in accordance with the results. I prefer, however, in treating grain, to use such an amount of moisture that when the whole grain is treated, this moisture when absorbed will leave them after treatment in their whole form. Many or all of the grains may of course be slightly cracked open but they still retain the whole form of the grain. When the receptacles or cans have the proper amount of material therein and are sealed, they are then placed in the tank 1. For convenience I have shown a particular form of holder for holding these receptacles or cans. In Figs. 3 and 4 I have shown one form of the holder which consists of the frame pieces 9 and 10 connected together by connecting piece 11, having open spaces between them. There are removable end pieces 12 and 13 which are made up of the separated strips 14 which are connected with a frame piece which holds them in position. I prefer to make both of the ends removable, said ends being held in place by rods 15 having the nuts or removable engaging pieces 16 at both ends thereof. The distance between the end pieces of the holders may be substantially the height of the cans or receptacles, although this distance will of course depend upon the conditions of use.

After the cans or receptacles are placed in these holders, said holders are then introduced into the tank 1. In the construction shown the tank is provided on the inside with the guide-ways 17 and 18 (see Fig. 2) and the receptacle holders are provided with projections 19 which fit therein. The projections preferably consist of rollers, so that when placed in the guide-way the holder can be easily moved into the tank. Several of the holders are placed in the tank 1 and the tank is then closed in any desired manner. In the construction shown the tank is provided with an end piece 20 hinged at 21 and is also provided with the hinged clamping pieces 22 having the nuts 23. The clamping pieces may be moved into the slotted parts 20ᵃ (see Fig. 2) and the nuts then tightened to hold the door or end piece in proper position. Some means is provided for heating the tank while the receptacles or cans are contained therein, and any suitable means may be provided. I prefer to heat the tank with a suitable heating agent such as vapor or steam. When this is done the vapor, steam or other heating agent from the pipe 24 may enter through the axis of the tank. I prefer for this purpose to support the pipe upon the support 25 so that it enters the tank at its axis through a stuffing box 26. The vapor or steam passes from the end 27 of the pipes into the chamber 28 and then through pipe 29 to the perforated pipe 30 which extends longitudinally along the tank. These perforated pipes are preferably perforated on both sides so as to distribute the vapor or steam, as shown in Fig. 2 so that it will not directly strike the receptacles or cans in the tank. I prefer to provide the pipe 24 with a flexible section 31 and also with a shut-off valve 32 and a safety valve 33 set so as to automatically open when the pressure reaches a predetermined amount, so as to prevent too great a pressure in the tank 1. I also prefer to provide means for admitting water to the pipe 34 connected by pipe 35 with the pipe 24, water passing through the same pipe as the steam, by shutting off the valve 32. The water pipe 34 also has a shut off valve 36. I may also permit air to enter the tank by means of a pipe 37 which enters the pipe 35 which has a shut off valve 38. The tank 1 may be provided with a relief valve 39 which may work simply through pressure or which may be automatically opened at intervals. Under the latter conditions the valve is provided with a stem 40, with a spring 41 which normally holds the valve in its closed position. As the tank rotates the stem 40 engages the part 42 which causes the stem to move to open the valve. This arrangement is shown clearly in Fig. 2. In carrying out the process with the particular construction shown, the cans or receptacles are placed in the tank, the tank closed, and the steam or vapor admitted, preferably at atmospheric pressure, the tank being rotated so as to cause the materials in the cans or receptacles to be forced by gravity from one portion of the can to another, so that the moisture will be evenly distributed and a uniform product secured. Before removing the cans or receptacles from the tank pressure or steam is increased to a sufficient amount so as to thoroughly sterilize the food product. This result can be secured by the pressure of several pounds say four or five pounds. I have not confined myself to any length of time or any particular method of applying the heat, as these factors will vary with the various materials treated and the results desired. In most cases, however, excellent results may be secured by heating the cans and the food therein in the tank 1 with steam at atmospheric pressure for several hours, say four hours and then increasing the pressure to several pounds above atmosphere, say four pounds, and heating with this increased pressure for say one hour, and then cooling. In some cases where there is an excess of treating liquid in the cans or receptacles, as where legumes are being treated, it is desirable to suddenly cool the material while the tank 1 is being rotated. This may be done by inserting a cooling fluid, such as cold water or air or the like. The water may be inserted through pipe 34 and the air or other gas through the pipe 37. With other material, such as grain, the cooling may be gradual. The movement of the cans or receptacles is preferably about a substantially horizontal axis, as this gives the best results, for by rotating or moving the mass of material about a substantially horizontal axis, such material is constantly tumbled toward the periphery of the receptacles, and comes in direct contact with the heating surface of the receptacle so that the heat penetrates the mass in a uniform manner in a much less time than if the heated mass is still and at the same time whatever treating liquid is in the receptacles or cans, is properly distributed throughout the mass of material. The length of time of the gradual cooling may of course be varied. When vapor or steam is used in the tank 1 the valve 39 permits the water of condensation to escape, and hence, this water of condensation cannot collect in the tank. In order to make the matter clear, I have described certain details and ways of carrying out the process, but it is of course evident that I am not limited to these particular details except as they are set forth in the claims herewith presented.

When it is desired to insert a cooling fluid or to increase the pressure in the tank to a pressure above that of the atmosphere, the part 42 which controls the valve 39 may be moved so that the valve stem 40 does not engage it. This may be done by any desired construction. As shown, one end of the part 42 is pivotally held in place by the bolt 43. The other end is provided with the slot 44 through which passes the bolt 45. When it is desired to move the part 42 out of engagement with the valve stem, said part is moved laterally, the bolt 45 passing along the slot 44.

Where I use in the specification and claim the term "grain," I use it as covering and including not only what is ordinarily termed "grain," such as wheat, oats, rice, &c., but as also covering and including legumes such as beans, and peas, and other like food material.

I claim:

1. The process of treating matured grain to prepare it for food, which consists in partially filling a receptacle with the grain and such amount of liquid that on completion of the process the treated grain will substantially fill the receptacle, sealing the receptacle and heating the receptacle and contents, the receptacle being given movement while being heated, to mix the grain and liquid and cause the heat to permeate the grain and cook it, and cooling the receptacle and grain, whereby the cooked grain is maintained in the sealed receptacle without change and with all food elements retained.

2. The process of treating matured grain to prepare it for food, which consists in partially filling a receptacle with the grain in the whole grain form and a small amount of treating liquid consisting of a solution of salt and sugar, sealing said receptacle and heating said receptacle and contents, simultaneously rotating said receptacle to bring the liquid into intimate contact with all the grain and cause the heat to permeate the grain and cook it, whereby the grain is cooked without any substantial change in form and retains all the vital food elements of the whole grain.

3. The process of cooking matured grain, which consists in placing a quantity of the grain in the receptacle in which it is sold, said grain partially filling said receptacle, and providing a portion of treating liquid for said grain, the amount of said liquid being such that it is substantially all absorbed by said grain during the process of cooking, sealing said receptacle, heating said receptacle and simultaneously moving it so that the interior portion of the grain is brought to the periphery of the receptacle and comes in contact with the heated surface thereof to secure a uniform heating, the moving of said receptacle causing a distribution of the treating liquid throughout the mass of the grain, the motion of said receptacle being continued through the cooking process until substantially all said liquid is absorbed by said grain, the grain being expanded thereby to substantially fill the receptacle, whereby said grain is completely cooked in the sealed receptacle in which it is sold, without the loss of any material part thereof.

4. The process of treating matured grain in the whole grain form to prepare it for food, which consists in partially filling a receptacle with the grain in the whole grain form and such amount of liquid that on the completion of the process the treated grain will substantially fill the receptacle, sealing said receptacle and heating the receptacle and contents, the receptacle being given movement while being heated to mix the grain and liquid and cause the heat to permeate the grain and cook it, the grain when cooked substantially filling the receptacle, whereby the cooked grain without material change from the whole grain form is maintained in the sealed receptacle with all its food elements retained.

In testimony whereof, I affix my signature in the presence of two witnesses this 28th day of August, 1917.

ALBERT BABENDREER.

Witnesses:
LAMEL M. DOREMUS,
CHRISTINA DEANS.